United States Patent [19]

Collins et al.

[11] 3,984,359

[45] Oct. 5, 1976

[54] POLYURETHANE FOAM USEFUL FOR INSULATED CONTAINERS

[75] Inventors: Michael H. Collins, Huxley, near Chester; Granville T. Merrall, Camberely, both of England; Wouter Hagens, Delft, Netherlands

[73] Assignee: Shell Oil Company, Houston, Tex.

[22] Filed: Jan. 24, 1975

[21] Appl. No.: 543,740

[30] Foreign Application Priority Data

Jan. 28, 1974 United Kingdom.................. 3755/74

[52] U.S. Cl. ........................... 260/2.5 AP; 220/9 F; 220/9 LG; 252/182; 260/2.5 AV; 260/2.5 AM; 428/313; 428/315; 428/425
[51] Int. Cl.$^2$.................. C08G 18/14; B65D 29/00; C09K 3/00
[58] Field of Search................. 260/2.5 AP, 2.5 AV, 260/2.5 AM; 428/313, 315, 425; 220/9 F, 9 LG; 252/182

[56] References Cited

UNITED STATES PATENTS

| | | | |
|---|---|---|---|
| 3,471,416 | 10/1969 | Fijal............................... | 260/2.5 AP |
| 3,476,933 | 11/1969 | Mendelsohn........................ | 260/2.5 |
| 3,502,239 | 3/1970 | Worboys et al. .................... | 220/9 F |
| 3,509,077 | 4/1970 | Schultz........................... | 260/2.5 AP |
| 3,546,145 | 12/1970 | Granger et al................. | 260/2.5 AP |
| 3,558,529 | 10/1971 | Whitman et al............... | 260/2.5 AP |
| 3,821,130 | 6/1974 | Barron et al................... | 260/2.5 AP |
| 3,824,199 | 7/1974 | Nadeau et al. ................ | 260/2.5 AP |
| 3,865,762 | 2/1975 | Repiquet et al. ............. | 260/2.5 AP |

*Primary Examiner*—H.S. Cockeram

[57] ABSTRACT

The invention is a novel hydroxyl-group containing component useful in the formation of polyurethane foam, a polyurethane foam and a process for making polyurethane foam using the novel hydroxyl-group containing component and an insulated container and a process for making an insulated container using polyurethane foam formed from the novel hydroxyl-group containing component.

10 Claims, No Drawings

POLYURETHANE FOAM USEFUL FOR INSULATED CONTAINERS

BACKGROUND OF THE INVENTION

It is known that certain polymeric foams may be used as thermal insulating barriers in containers. The polyurethane foams are one example of the type of polymeric foams used as thermal insulating barriers. One of the uses for polyurethane foams as a thermal insulating barrier is in storage and/or transport of cold liquids e.g., liquefied gases at cryogenic temperatures.

It is known that containers can be insulated by lining the inner surface of the rigid outer shell with polyurethane foam. Liquefied gases for storage or transport in such containers are at very low temperatures (for example, liquefied methane or natural gases are at a temperature of about minus 160°C (113°K) at atmospheric pressure) and therefore the risk exists of cracks developing in the lining of polyurethane foam and having liquefied gas pass through these cracks and reach the rigid outer shell. Since the rigid outer shell is normally made of a steel which loses its ductility at the low temperatures of the liquefied gases, contact between the cold liquefied gases and the rigid outer shell must be prevented by all means. This is especially true in the case of large seagoing tankers.

The conventional methods of preparing containers for liquefied gases is to sandwich the polyurethane foam between a metal outer shell and a metal inner shell, thereby preventing the polyurethane foam from coming into direct contact with the cold liquid. However, there are new methods of forming containers which involve only an outer metal layer on the inner side of which a polyurethane foam impregnated with epoxy/fiber glass composites is deposited. In such a container the polyurethane foam is directly in contact with the liquefied gas. These new containers are described in U.S. Pat. No. 3,502,239, issued Mar. 24, 1970 and U.S. Patent Application Ser. No. 523,641 filed Nov. 14, 1974 now abandoned.

The risk of a leak where the cold liquid comes in contact with the outer metal layer of the container via rupture of the polyurethane layer is somewhat less in the conventional sandwich structure than in the container where the polyurethane foam is in direct contact with the liquefied gas. The resistance of the polyurethane foam to the liquefied gas is dependent on the molecular structure of the polyurethane as well as the foam structure. It can be appreciated that because of the fire and pollution hazards associated with rupture of a container of hydrocarbons, the risk of such a rupture must be kept at a minimum. Yet the savings in construction costs and in container weight make the metal/polyurethane foam structure much more attractive than metal/polyurethane foam/metal structures. This risk can be lowered by building metal/polyurethane foam containers where the cold liquid is in direct contact with the polyurethane with polyurethane foam made from the hydroxyl containing component of this invention.

SUMMARY OF THE INVENTION

The invention is an improved hydroxyl-containing component for preparing polyurethane foams which comprises from about 1 to about 5 hydroxyl containing compounds where the compound or mixture of compounds have individual equivalent weights and are present in such a ratio that the sum of the equivalents of each compound containing active hydrogens divided by the sum of the moles of each compound in the hydroxyl component containing active hydrogens is a number from about 1.8 to about 2.7 and furthermore, the sum of the equivalents of each active hydrogen compound multiplied by 1000 divided by the total weight of all of the active hydrogen containing compounds is a number from about 6 to 11. The invention is also directed to polyurethane foams and a process for making this foam using the above defined hydroxyl containing component and a polyisocyanate where the reaction mixture used to form the polyurethane foam contains compounds having reactive hydrogens and isocyanate functional groups such that the sum of the equivalents of each active hydrogen containing compound plus each organic isocyanate containing compound divided by the sum of the moles of such active-hydrogen compounds and isocyanate-group containing compounds is equal to 1.8 to 2.7 inclusive and the sum of all the equivalents of the or each active-hydrogen compound plus the equivalents of the or each isocyanate-group containing compound of all components which are used to form the reaction mixture multiplied by 1000 and divided by the total amount in grams of all components (excluding the weight of any liquid low-boiling point foam agent) which form the reaction mixture, equals 6 to 11. Furthermore, the invention includes containers and a process for making containers for cold liquid hydrocarbons using the above polyurethane foam.

DESCRIPTION OF THE PREFERRED EMBODIMENTS

Polyurethanes are formed from two basic components, an isocyanate component and a hydroxyl containing component. The basic reaction may be depicted as follows:

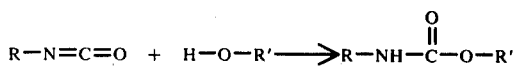

The isocyanate function reacts with the active hydrogen of the hydroxyl function to form the urethane linkage. The reaction of the isocyanate with active hydrogen containing compounds can be catalyzed by base. Typical catalysts are N-methyl morpholine, dimethylethanolamine, triethylamine and N,N'-diethylcyclohexylamine. The conventional active hydrogen component is polyalcohol but other active hydrogen compounds such as amines, phenols, acids and water will react with the isocyanate group. The polymer-forming isocyanate components contain greater than one isocyanate functional group per molecule and the typical isocyanate component contains two isocyanates groups per molecule. The polymer forming hydroxyl component contains greater than 1 active hydrogen containing function where an active hydrogen containing function is defined as one that can form a link with the carbonyl carbon of the isocyanate function.

THE HYDROXYL COMPONENT

The hydroxyl component of this invention is a compound or mixture of compounds having a specific active hydrogen/molecular weight balance that when reacted with a polyisocyanate together with a foam forming component, form polyurethane foam exhibiting improved resistance to rupture when in contact with cold hydrocarbons. The improved hydroxyl component comprises at least one, preferably from 1 to 5 inclusive and most preferably from 2 to 5 inclusive hydroxyl group containing compounds (hereafter referred to as hydroxyl compounds) where the sum of the equivalents of the hydroxyl compounds which make up the hydroxyl component divided by the sum of the moles of each hydroxyl compound which make up the hydroxyl component is equal to a number hereinafter referred to as NAF (number average functionality) ranging from about 1.8 to about 2.7, preferably from about 1.8 to about 2.6 and most preferably from about 2.0 to about 2.6. Furthermore the sum of the equivalents of the hydroxyl compounds which make up the hydroxyl component multiplied by 1,000 divided by the total weight in grams of the compounds which make up the hydroxyl compound (excluding low-boiling point foaming agents) is a number hereinafter referred to as $RGC_1$ (reactive group content) ranging from about 6 to 11, preferably from about 6.5 to about 10 and most preferably from about 7 to about 10.

The term equivalents as used above is defined as the weight in grams (W) of a hydroxyl compound used in the hydroxyl component divided by the equivalent weight of a hydroxyl compound which is defined as the molecular weight (M) in grams of a hydroxyl compound divided by the number of active hydrogens per hydroxyl compound (H) where an active hydrogen is one that will react with an isocyanate group. Given these definitions, the $NAF_1$ number and the $RGC_1$ number, may be expressed as follows:

$$NAF_1 = \left( \frac{\sum_{n=A}^{n=E} \frac{W(n)}{M(n)} \cdot \frac{1}{H(n)}}{\sum_{n=A}^{n=E} \frac{W(n)}{M(n)}} \right)$$

$$RGC_1 = \left( \frac{\sum_{n=A}^{n=E} \frac{W(n)}{M(n)} \cdot \frac{1}{H(n)} \cdot 1000}{\sum_{n=A}^{n=M} W(n)} \right)$$

where the subscript n represents a compound in the hydroxyl component, A-E represents the 5 possible hydroxyl compounds and A-M represents A-E and any other compound present in the hydroxyl component excluding any liquid low-boiling point blowing agent or organic isocyanate.

If the hydroxyl component comprises more than one hydroxyl compound they may be added separately to form the hydroxyl reaction mixture or premixed before forming the hydroxyl reaction mixture (where hydroxyl reaction mixture means all of the compounds and materials used to make the polyurethane foam excluding the blowing agent and the polyisocyanate), with the latter being preferred. The hydroxyl compounds which are used to form the hydroxyl reaction mixture may be monools, polyols having no ether linkages, polyols having one ether linkage, polyols having at least two ether linkages (polyethers), polyester polyols or aminoalcohols. The functionalities of such compounds may be 1, 2, 3 or 4 or even higher provided that the reaction mixture has a low $NAF_1$ and a high $RGC_1$. Preferably, the hydroxyl reaction mixture is formed from mixtures of hydroxyl compounds having functionalities of 2 and 3 or most preferably having functionalities of only 2.

For example, the hydroxyl component can be formed from a combination of diols having low molecular weights e.g. of less than 500 and diols having medium or high molecular weight e.g. of at least 500.

Particularly suitable as hydroxyl compounds are diols (other than polyether diols and amino-diols) having molecular weights of at most 250; polyether diols having molecular weights of at least 150; polyether triols having molecular weights of at least 200 and compounds which, in addition to having at least one hydroxyl-group, have at least one primary or secondary nitrogen atom. Suitable polyethers may be prepared by reacting a difunctional initiator with propylene oxide and/or ethylene oxide. Preferred hydroxyl compounds are diols (other than polyether diols and amino-diols) having molecular weights of at most 150, e.g., dipropylene glycol; polyether diols having molecular weights in the range of from 750 to 1,250, e.g., polypropylene glycol of molecular weight of about 1,050; polyether triols having molecular weights in the range of from 200 to 400 e.g. a glycerol/propylene oxide adduct of molecular weight of about 300; and amino-alcohols having three active hydrogen atoms e.g. di-isopropanolamine and diethanolamine. Some of the above compounds e.g., polyether diols may be suitable as the sole hydroxyl compound of the hydroxyl component whereas others, such as polyether triols may only be used in combination with lower functionality compounds.

For use in preparing the lining of a storage or shipping tank a first preferred hydroxyl component comprises the following mixture of hydroxyl compounds,
i. a diol (other than a polyether diol or amino-diol) having a molecular weight of at most 250, preferably below 150, e.g., dipropylene glycol,
ii. a polyether diol having a molecular weight of at least 500, preferably in the range of from 750 to 1350 e.g., polypropylene glycol of molecular weight of about 1050; and
iii. an amino-alcohol having three active hydrogen atoms e.g., di-isopropanolamine or diethanolamine, wherein the amount of (i) is in the range of from 20 to 70 percent by weight, the amount of (ii) is in the range of from 30 to 80% wt. and the amount of (iii) in the range of from 0 to 12% wt., more preferably 1.0 to 12% wt. Water may also be present preferably in an amount in the range of from 0 to about 25% wt., more preferably from about 0.01 to about 1.5% wt. (All percentages being based on the total weight of (i) and (ii)). The first preferred hydroxyl component may also contain catalysts, stabilizers, plasticizers and/or flame-retardants and the like.

A second preferred hydroxyl component comprises, as hydroxyl-compounds (i), (ii) and (iii) as described for the first preferred hydroxyl component, and in addition
iv. a polyether triol having a molecular weight of at least 200, preferably in the range of from 200 to 400 e.g., a glycerol/propylene oxide adduct of molecular weight of about 300, wherein the amount of (i) is in the range of from 3 to 35% wt., the amount of (ii) is in the range of from 2 to 75% wt. the amount of (iii) is from 0 to about 12% wt., more preferably from about 1 to about 12% wt. and the amount of (iv) is from about 20 to about 70% wt.

The mixture may also contain water in an amount in the range of from 0 to about 2% wt., more preferably from about 0.01 to about 1.5% wt. (All percentages being based on the total weight of (i), (ii) and (iv)). The second preferred hydroxyl component may also contain catalysts, stabilizers, plasticizers and/or flame retardants and the like.

POLYURETHANE FOAMS

The present invention is also concerned with the preparation of polyurethane foam by reacting, under foam forming conditions, a hydroxyl component comprising at least one, preferably from two to five, hydroxyl compounds with an organic polyisocyanate component, wherein the reaction mixture has a low $NAF_2$ and a high $RGC_2$ as defined below. By "low" is meant that the reaction mixture has a lower $NAF_2$ than reaction mixtures conventionally used in practice to prepare rigid polyurethane foam and by "high" is meant that the reaction mixture has a higher $RGC_2$ than reaction mixtures conventionally used in practice to prepare flexible or semi-flexible polyurethane foam.

In this specification and claims the term "number average functionality of the reaction mixture" (abbreviated to $NAF_2$) is defined as the sum of all the equivalents of the or each hydrogen atom-containing compound present therein which is capable of reacting with an organic isocyanate (hereinafter referred to as "active-hydrogen compound") plus the equivalents of the or each isocyanate-group containing compound of all components which are used to form the reaction mixture, divided by the sum of the moles of such active-hydrogen compounds(s) and isocyanate-group containing compound. The term "reactive group content of the reaction mixture" (abbreviated to $RGC_2$ and expressed in milli-equivalents per gram) is defined as the sum of all the equivalents of the or each active-hydrogen compound plus the equivalents of the or each isocyanate-group containing compound of all components which are used to form the reaction mixture multiplied by 1000 and divided by the total amount (in gram) of all components (excluding the weight of any liquid low-boiling point foaming agent) which form the reaction mixture.

The terms $NAF_2$ and $RGC_2$ may be further defined using the symbols previously defined as follows:

$$NAF_2 = \left[ \frac{\sum_{n=A}^{n=E} \frac{W(n)}{M(n)H(n)} + \sum_{i=O}^{i=X} \frac{W(i)}{M(i)I(i)}}{\sum_{n=A}^{n=E} \frac{W(n)}{M(n)} + \sum_{i=O}^{i=X} \frac{W(i)}{M(i)}} \right]$$

$$RGC_2 = \left[ \frac{\left( \sum_{n=A}^{n=E} \frac{W(n)}{M(n)H(n)} + \sum_{i=O}^{i=X} \frac{W(i)}{M(i)I(i)} \right) \times 1000}{\sum_{n=A}^{n=M} W(n) + \sum_{i=O}^{i=Z} W(i)} \right]$$

where I is the number of isocyanate functional groups per a polyisocyanate compound, the subscript i means one of the polyisocyanate compounds making up the reactional mixture, O to X means a mixture containing all polyisocyanate compounds making up the polyisocyanate component, O to Z means all components making up the polyisocyanate component except low molecular weight blowing agent.

Suitably, the reaction mixture has a $NAF_2$ in the range of from 1.8 to 2.7 preferably from 2.0 to 2.6, and a $RGC_2$ in the range of from 6 to 11, preferably from 6.5 to 10 and most preferably from 7 to 10.

The polyurethane foam is preferably formed by the "one-shot" process although it is possible to use a prepolymer process as will be understood by those skilled in the art. However, the further disclosures of this application are directed to the "one-shot" process unless otherwise specified. When using a prepolymer process, the components which are used to prepare the prepolymers as well as the components which are further reacted with the prepolymers to prepare the foam should be taken into account when determining the $NAF_2$ and $RGC_2$ of the reaction mixture. When using the one-shot process the $NAF_2$ of the reaction mixture is usually the same as the $NAF_1$ of the hydroxyl component since it is impractical to premix and store an active-hydrogen compound with the organic polyisocyanate component; however, the $RGC_2$ of the reaction mixture may be different from the $RGC_1$ of the hydroxyl component if it is decided to premix any of the nonactive hydrogen compounds thereof (as hereinafter described) with the organic polyisocyanate component.

The reaction mixture may also contain small amounts of water. Since water may be considered to have two active-hydrogen atoms it should be taken into account when calculating both the $NAF_2$ and $RGC_2$ of the reaction mixture. The reaction mixture may also contain one or more catalysts which catalyze the reaction between the active-hydrogen compounds and the organic polyisocyanate component. The catalysts may themselves be reactive i.e., may contain at least one active-hydrogen atom, or be nonreactive. If a catalyst is reactive, it should be taken into account when determining both the $NAF_2$ and $RGC_2$ of the reaction mixture. If it is nonreactive, that is, having no active hydrogens, it need only be taken into account when determining the RGC of the reaction mixture. Suitable catalysts include triethylamine, N,N-dimethylcyclohexylamine, tetramethylguanidine, dibutyl tin dilaurate, 2-dimethylaminoethanol, triethylenediamine and pentamethyldiethylene triamine or mixtures thereof. A particularly preferred catalyst is a mixture of pentamethyldiethylene triamine and dibutyl tin dilaurate.

The reaction mixture may also contain a cell stabilizer such as a silicone oil surfactant. Such silicone oils may or may not have active-hydrogen atoms but if they have then they have only a small effect on the $NAF_2$ of the reaction mixture. Examples of silicone oils include DC 193 (Dow Corning), SF 1066 and SF 1165 (both General Electric). The amount of silicone oil is usually in the range of from 0.05 to 2.0% wt., based on the weight of hydroxyl compound(s) used to form the reaction mixture.

The reaction mixture may also contain plasticizers and/or flame retardants such as tri-chloroethylphosphate, in amounts of from 10 to 30% wt. based on the weight of hydroxyl compound(s) used to form the reaction mixture and stabilizers such as alloocimene which remove free radicals from the hydroxyl compounds used to form the reaction mixture.

Those of the above compounds which do not have active-hydrogen atoms may be premixed with either the hydroxyl compounds(s) or the organic polyisocyanate component or added separately to the reaction mixture. Generally, all compounds containing active hydrogen atoms are premixed with the hydroxyl compound(s) although they could also be added separately to the reaction mixture if necessary.

Preferably, the organic polyisocyanate component used to prepare the polyurethane foam is crude diphenylmethane diisocyanate, e.g., "Caradate" 30, "Desmodur" 44, V20 or "PAPI", although other polyarylpolyisocyanates and monoarylpolyisocyanates may be used. Examples of monoarylpolyisocyanates are toluene-2,4-diisocyanate and toluene 2,6-diisocyanate and mixtures thereof, such as 80:20 or 65:35 weight ratio mixtures thereof. The preferred crude diphenylmethane diisocyanate is prepared by phosgenation of crude diphenylmethane diamine. Crude diphenylmethane diisocyanate usually comprises a mixture of diphenyl-4,4'-diisocyanate, diphenyl-2,4'-diisocyanate and related polyisocyanates of higher molcular weight and functionality, such as the tri- and tetraisocyanates.

The amount of organic polyisocyanate used may vary over wide limits. Suitable amounts are such to provide an isocyanate index of from 95 to 130 with from 100 to 125 being preferred. (Isocyanate index is defined as the ratio of free NCO to 100 reactive group (active hydrogens)).

Preferably, the foam producing condition used to prepare the polyurethane foam is achieved by including in the hydroxyl component and/or organic polyisocyanate component, or by adding separately to the reaction mixture, a liquid low-boiling point agent, which is substantially inert towards the components and which is vaporized by the heat of the polyurethane-forming reaction. Suitable inert blowing agents include dichlorodifluoromethane, trichlorofluoromethane, methylene chloride, pentanes and hexanes, with trichlorofluoromethane being preferred. Water may also be used. Preferably, the amounts of blowing agent and other components are such that the lining has a density in the range of from 30 to 140 kilograms per cubic meter ($kg/m^3$) at 20°C. However, if the lining is to be subjected to high static and/or dynamic pressure then the density is preferably at least 60 $kg/m^3$, the upper density limit being determined by the desired heat transfer coefficient of the polyurethane foam and the economy of the system being used.

INSULATED CONTAINERS

The thermally insulated storage or transport containers of this invention are those made using the polyurethane foam made from a reaction mixture in which the $NAF_2$ ranges from about 1.8 to about 2.7, preferably from about 2.0 to about 2.7 and most preferably between 2.0 and 2.6 and the $RGC_2$ ranges from about 6 to 11, preferably from about 6.5 to about 10 and most preferably from about 7 to about 10. These containers are especially useful for the liquefied gases methane and natural gas.

A preferred embodiment of this invention is a container comprising a rigid outer shell, for example the hull of a ship, to which has been applied an inner layer or layers of polyurethane foam prepared by reacting under foam forming conditions a hydroxyl component comprising at least one and preferably from 2 to 5 inclusive hydroxyl compounds with an organic polyisocyanate component, where the reaction mixture has a $NAF_2$ and $RGC_2$ as described above.

It is desirable for this particular application of the polyurethane foam that a combination of a low $NAF_1$ value and a low $RGC_1$ value is avoided, e.g., a $NAF_1$ of below 2 in combination with a $RGC_1$ of below 8. Thus, if the $NAF_1$ is in the range of from 1.8 to 2.0, the $RGC_1$ is, preferably, in the range of from 8 to 11, and if the $RGC_1$ is in the range of from 6 to 8, the $NAF_1$ is, preferably in the range of from 2 to 2.7.

The structure of the above preferred embodiment together with the recommended density of the polyurethane foam layers is described in detail in U.S. Pat. No. 3,502,239 which issued Mar. 24, 1970 and this patent is hereby incorporated as a reference.

A second preferred embodiment of this invention is a container comprising a rigid outer layer, for example, a metal such as steel, to which a layer (or layers) of polyurethane foam has been added as a liner where one or more barriers made from glass fibers and an epoxy resin system have been embedded into the polyurethane foam, wherein the polyurethane has been formed under foaming conditions from a reaction mixture having an $NAF_2$ and $RGC_2$ as described above.

The structure of this second preferred container is further described in U.S. Patent Application Ser. No. 523,641, filed Nov. 14, 1974 now abandoned, which is incorporated herein as a reference.

The aforesaid lining for the containers is usually "rigid" and may be prepared by spraying the reaction mixture onto the inner surface of the rigid outer shell in which case the hydroxy component preferably includes an amino alcohol, such as diisopropanolamine or diethanolamine. The lining may be built up in layers, say 20 to 40 layers, to produce a lining of about 20 to 30 cm thickness. If the lining is prepared properly there will be good bonding between such layers and the tensile strength in the interlayer region will be similar to the tensile strength within the bulk of the foam. A suitable apparatus for spraying the reaction mixture is described in U.K. Patent No. 1,300,352.

The lining may comprise two thicknesses of polyurethane foam having different densities. Such a structure is described in U.K. Patent Specification 1,173,424.

Under some circumstances it is useful to apply different formulations for the different layers, for example one formulation for spraying foam on foam and another formulation for spraying foam on steel or foam on the barrier.

The following illustrative embodiments are for illustration only; no limitations on the scope of the claims is implied by the choice of materials or conditions used below.

EXAMPLE 1

A substrate was lined with rigid polyurethane foam by spraying the reaction mixtures formed from the components described in Table 1 onto the substrate. The lining was built up in layers until a minimum thickness of 20 cm was obtained (about 20 layers). The foam properties are given in Table 2.

EXAMPLE 2

The inner surface of a rigid outer shell of a container for the storage and/or transport of liquefied gases was lined with rigid polyurethane foam by spraying thereon reaction mixtures formed from the components described in Table 1.

TABLE 1

| Reaction mixture | Sample (wt. in grams (g)) | | | | | | | | |
|---|---|---|---|---|---|---|---|---|---|
| | 1 | 2 | 3 | 4 | 5 | 6 | 7 | 8 | 9 |
| Hydroxyl component | | | | | | | | | |
| Dipropylene glycol (MW 137) | 22.6 | 42.0 | 51.4 | 18.4 | 49.9 | 29.9 | 9.4 | 40.9 | 13.7 |
| Polypropylene glycol (MW 1050) | 22.8 | 58.0 | 48.6 | 32.9 | 50.1 | 4.6 | 55.0 | 59.1 | 44.5 |
| Glycerol/PO adduct (MW 294) | 54.7 | — | — | 48.7 | — | 65.4 | 35.6 | — | 41.8 |
| Di-isopropanolamine | — | 8.5 | — | — | 2.1 | 2.4 | 8.4 | 2.0 | 2.4 |
| Diethanolamine | 1.6 | — | 7.9 | 6.7 | — | — | — | — | — |
| Water (added) | — | 1.18 | 1.39 | 0.01 | 1.12 | 0.02 | 0.01 | 0.04 | 1.31 |
| Catalyst (1) | 6.0 | 4.0 | 7.0 | 4.7 | 4.0 | 5.2 | 5.2 | 7.0 | 4.0 |
| Trichloroethylphosphate | — | — | 20 | — | — | 20 | — | — | 20 |
| Silicone Oil (SF 1066) | 1.39 | 1.35 | 0.18 | 1.46 | 1.42 | 0.17 | 1.17 | 0.12 | 1.45 |
| Allo-ocimene | 0.2 | 0.2 | 0.2 | 0.2 | 0.2 | 0.2 | 0.2 | 0.2 | 0.2 |
| Trichlorofluormethane (TCFM-11) | 27.9 | 7.1 | 21.3 | 20.4 | 17.1 | 23.2 | 23.2 | 16.5 | 16.0 |
| Organic Polyisocyanate Component | | | | | | | | | |
| Crude diphenylmethane di-isocyanate (2) | 172 | 156 | 217 | 181 | 175 | 206 | 120 | 135 | 162 |
| $NAF_1$ | 2.51 | 2.31 | 2.33 | 2.53 | 2.27 | 2.51 | 2.55 | 2.28 | 2.47 |
| $RGC_1$ | 8.06 | 8.18 | 8.06 | 8.09 | 8.14 | 8.13 | 7.22 | 7.26 | 7.30 |
| $NAF_2$ | 2.52 | 2.13 | 2.13 | 2.58 | 2.03 | 2.52 | 2.60 | 2.04 | 2.43 |
| $RGC_2$ | 8.94 | 9.08 | 8.95 | 9.03 | 9.15 | 9.14 | 6.92 | 6.94 | 7.04 |
| Isocyanate Index | 125 | 105 | 125 | 125 | 125 | 125 | 105 | 125 | 125 |

(1) In samples 1, 2, 6 and 7 the catalyst was a mixture of pentamethyldiethylene triamine (DPV) and dibutyl tin dilaurate in a 5:1 weight ratio. In samples 3, 4, 5, 8 and 9 the catalyst was a mixture of the same components in a 25:1 weight ratio.
(2) "Caradate" 30.

TABLE 2

| Reaction mixture | | 1 | 2 | 3 | 4 | 5 | 6 | 7 | 8 | 9 |
|---|---|---|---|---|---|---|---|---|---|---|
| Tensile strength | 20°C | 454 | 1045 | 525 | 825 | 608 | 483 | 603 | 502 | 497 |
| with rise ($kN/m^2$) | −196°C | 811 | 1897 | 863 | 1497 | 774 | 1212 | 1583 | 933 | 762 |
| Compression strength | 20°C | 290 | 638 | 252 | 615 | 222 | 366 | 371 | 355 | 223 |
| with rise ($kN/m^2$) | −196°C | 819 | 2010 | 634 | 1702 | 557 | 835 | 1475 | 989 | 601 |
| Coefficient of expansion $\times 10^6$ (20°C to −196°C) with rise | | 52 | 49 | 49 | 49 | 66 | 48 | 50 | 63 | 66 |
| Density ($kg/m^3$) at 20°C | | 55 | 85 | 70 | 87 | 77 | 80 | 66 | 130 | 69 |

We claim as our invention:

1. A hydroxyl component for the formation of polyurethane foams used in insulated containers wherein the foam shows improved resistance to cracking under cold conditions which consists essentially of
   a. from 20 to 70% wt, total, of one or more diols having m ether linkages, where m is 0 or 1, and having a molecular weight of at most 250,
   b. from 30 to 80% wt, total, of one or more polyethers of propylene oxide having n hydroxyl groups per molecule, where n is 2 or 3; and
   c. from 0 to 12% wt, total, of one or more aminoalcohols having three active hydrogen atoms; wherein all percentages are based on the combined weight of components (a) and (b), and said hydroxyl component has a number average functionality in the range of from about 1.8 to about 2.7 and a reactive group content in the range of from about 6 to about 11.

2. The hydroxyl component of claim 1 wherein (b) is a polypropylene glycol having a molecular weight range of 500–1350.

3. The hydroxyl component of claim 2 wherein (a) is dipropylene glycol, (b) is polypropylene glycol having a molecular weight of about 1050 and (c) is diethanolamine.

4. A hydroxyl component for the formation of polyurethane foams used in insulated containers wherein the foam shows improved resistance to cracking under cold conditions, which consists essentially of:
   a. from 3 to 35% wt, total, of one or more diols having m ether linkages, where m is 0 or 1, and having a molecular weight of at most 250,
   b. from 2 to 75% wt of a polypropylene glycol having a molecular weight in the range of 500–1350,
   c. from 0 to 12%, wt, total, of one or more aminoalcohols having three active hydrogen atoms; and
   d. from 20 to 70 wt % of a polyether of propylene oxide having 3 hydroxyl groups and having a molecular weight of at least 200; wherein all percentages are based on the combined weight of components (a), (b) and (d), said hydroxyl component having a number average functionality in the range of from about 1.8 to about 2.7 and a reactive group content in the range of from about 6 to about 11.

5. The hydroxyl component of claim 4 where (a) is dipropylene glycol, (b) is a polypropylene glycol of a molecular weight of about 1050 (c) is diisopropanolamine and (d) is a polyether of propylene oxide having a molecular weight of about 300.

6. An improved process for the formation of polyurethane foam showing improved resistance to cracking under cold conditions which comprises reacting, under foam forming conditions, a reaction mixture comprising an organic polyisocyanate component and a hydroxyl component consisting essentially of
   a. from 20 to 70% wt, total, of one or more diols having m ether linkages, where m is 0 or 1, and having a molecular weight of at most 250,
   b. from 30 to 80% wt, total, of one or more polyethers of propylene oxide having n hydroxyl groups per molecule, where n is 2 or 3; and
   c. from 0 to 12% wt, total, of one or more aminoalcohols having three active hydrogen atoms; wherein all percentages are based on the combined weight of components (a) and (b), and said reaction mixture has a number average functionality in the range from about 1.8 to about 2.7 and a reactive group content in the range of from about 6 to about 11.

7. The improved process of claim 6 where the polyisocyanate component is a mixture of diphenyl-4,4'-diisocyanate and diphenyl-2,4'-diisocyanate.

8. The improved process of claim 7 where the number average functionality is in the range of from about 2.0 to about 2.6.

9. The improved process of claim 8 where the reactive group content is in the range of from about 7 to about 10.

10. In a process for the preparation of insulated containers for storage and/or transport of cold liquids which comprise an outer rigid surface and an inner polyurethane foam layer or layers, optionally containing barriers composed of glass fiber and epoxy resin impregnated in the polyurethane, the improvement which comprises employing as the precursor of the polyurethane foam layer or layers a reaction mixture comprising a polyisocyanate component and a hydroxyl component consisting essentially of a. from 20 to 70% wt, total, of one or more diols having m ether linkages, where m is 0 or 1, and having a molecular weight of at most 250, b. from 30 to 80% wt, total, of one or more polyethers of propylene oxide having n hydroxyl groups per molecule, where n is 2 or 3 and c. from 0 to 12% wt, total, of one or more aminoalcohols having three active hydrogen atoms; wherein all percentages are based on the combined weight of components (a) and (b), and said reaction mixture has a number average functionality in the range from about 1.8 to about 2.7 and a reactive group content in the range of from about 6 to about 11.

* * * * *